(12) United States Patent
Seitchik et al.

(10) Patent No.: US 10,152,843 B2
(45) Date of Patent: Dec. 11, 2018

(54) HYBRID FORECOURT CONTROLLERS

(71) Applicant: Allied Electronics, Inc., Bristol, PA (US)

(72) Inventors: Louis Seitchik, New York, NY (US); Robert E. Tomenchok, Jr., Lambertville, NJ (US)

(73) Assignee: Allied Electronics, Inc., Bristol, PA (US)

( * ) Notice: Subject to any disclaimer, the term of this patent is extended or adjusted under 35 U.S.C. 154(b) by 195 days.

(21) Appl. No.: 15/293,339

(22) Filed: Oct. 14, 2016

(65) Prior Publication Data

US 2017/0161524 A1 Jun. 8, 2017

Related U.S. Application Data

(60) Provisional application No. 62/263,832, filed on Dec. 7, 2015.

(51) Int. Cl.
*G06F 7/04* (2006.01)
*G07F 15/00* (2006.01)
*G06F 21/57* (2013.01)

(52) U.S. Cl.
CPC ............ *G07F 15/001* (2013.01); *G06F 21/57* (2013.01)

(58) Field of Classification Search
CPC ......... G06F 21/74; G06F 21/75; G07F 15/001
USPC ........................................................ 726/17
See application file for complete search history.

(56) References Cited

U.S. PATENT DOCUMENTS

| | | | | |
|---|---|---|---|---|
| 6,352,176 B1 * | 3/2002 | Hartsell, Jr. | ........... | B67D 7/085 222/1 |
| 6,360,138 B1 * | 3/2002 | Coppola | .............. | G06Q 20/341 700/231 |
| 6,442,448 B1 * | 8/2002 | Finley | .................... | B67D 7/145 700/231 |
| 6,725,106 B1 * | 4/2004 | Covington | ............... | B67D 7/14 222/52 |
| 2007/0169842 A1 * | 7/2007 | King | ................ | B60K 15/03504 141/302 |

* cited by examiner

*Primary Examiner* — Samson B Lemma
(74) *Attorney, Agent, or Firm* — Mendelsohn Dunleavy, P.C.; Steve Mendelsohn

(57) ABSTRACT

One embodiment is a hybrid forecourt controller (FCC) for a fuel-dispensing facility having forecourt devices and in-store systems. The hybrid FCC has a closed sub-system communicating with and controlling operations of the forecourt devices and an open sub-system communicating with and controlling operations of the in-store systems. The closed sub-system communicates with the open sub-system to enable the forecourt devices and the in-store systems to operate together to support operations of the fuel-dispensing facility. The closed sub-system prevents third parties from modifying any of the closed operating system and the closed software applications corresponding to the forecourt devices of the closed sub-system, while the open sub-system enables third parties to modify any of the open operating system and the open software applications corresponding to the in-store systems of the open sub-system.

14 Claims, 3 Drawing Sheets

HYBRID FORECOURT CONTROLLERS

CROSS-REFERENCE TO RELATED APPLICATIONS

This application claims the benefit of the filing date of U.S. provisional application No. 62/263,832, filed on Dec. 7, 2015, the teachings of which are incorporated herein by reference in their entirety.

BACKGROUND

Field of the Invention

The present invention relates to forecourt controllers for gas stations and the like.

Description of the Related Art

This section introduces aspects that may help facilitate a better understanding of the invention. Accordingly, the statements of this section are to be read in this light and are not to be understood as admissions about what is prior art or what is not prior art.

In retail stores that sell fuel (including, but not limited to, gas stations, truck stops, convenience stores, big-box retailers, military base exchanges), the forecourt is located outside of the store's structure and includes some or all of the following equipment:

AFDs (automated fuel dispensers);
Payment terminals, either stand-alone or integrated into the AFDs, each of which accepts payments and provides a display, a keypad, and a printer;
Fuel tanks, ATGs (automated tank gauges), and ATG controllers;
Car washes and car wash controllers;
RFID (radio frequency identification) antennae and RFID controllers;
Electronic price signs and price sign controllers; and
Leak detection systems.

Residing inside the store are systems providing POS (Point of Sale), BO (Back Office), EPS (Electronic Payment Services), and other business functions. Some or all of those "inside" systems need to communicate with the "outside" forecourt devices. This communication is typically performed via a forecourt controller (FCC).

The FCC is a computer system running on its own hardware, connected to the store's LAN (local area network), communicating via the TCP/IP (Transmission Control Protocol/Internet Protocol) protocol with the in-store systems, and using legacy serial communications (e.g., RS-232, RS-485, current loop, and/or other proprietary interfaces) to communicate with the forecourt devices. As the next generation of forecourt devices evolves, some of those legacy serial interfaces are being replaced by TCP/IP.

Forecourt controllers originated out of a need to control fuel dispensers from inside the gas station. The first FCCs were developed by the same companies that manufactured fuel dispensers. Over time, other companies entered the marketplace.

First-generation FCCs allowed fuel dispensers to be authorized, prices to be changed, and transactional data to be collected from the dispenser and accessed inside the store. An RS232 or some other serial communication interface connected the FCC to the POS.

Second-generation FCCs added communication to devices such as outside payment terminals and ATG controllers. Integrating outside payment terminals allowed customers to complete their fuel transaction (provide payment, dispense fuel, and print receipt) without going into the store. Integrating ATG controllers allowed store managers to monitor tank inventory without manually accessing the fuel tank, the ATG, or the ATG controller.

Third-generation FCCs integrated EPS functions, making the FCC the gateway to payment processors. Further, the interface between the business processes inside the store and the FCC migrated from serial to TCP/IP.

FCCs typically require some proprietary hardware, because the custom serial interfaces presented by forecourt devices are not supported in COTS (Consumer Off-The-Shelf) hardware. While early FCCs used completely proprietary software (operating system and applications), modern systems often combine an OS (operating system) such as a Linux OS or an Embedded Windows OS with custom applications.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Figure 1:
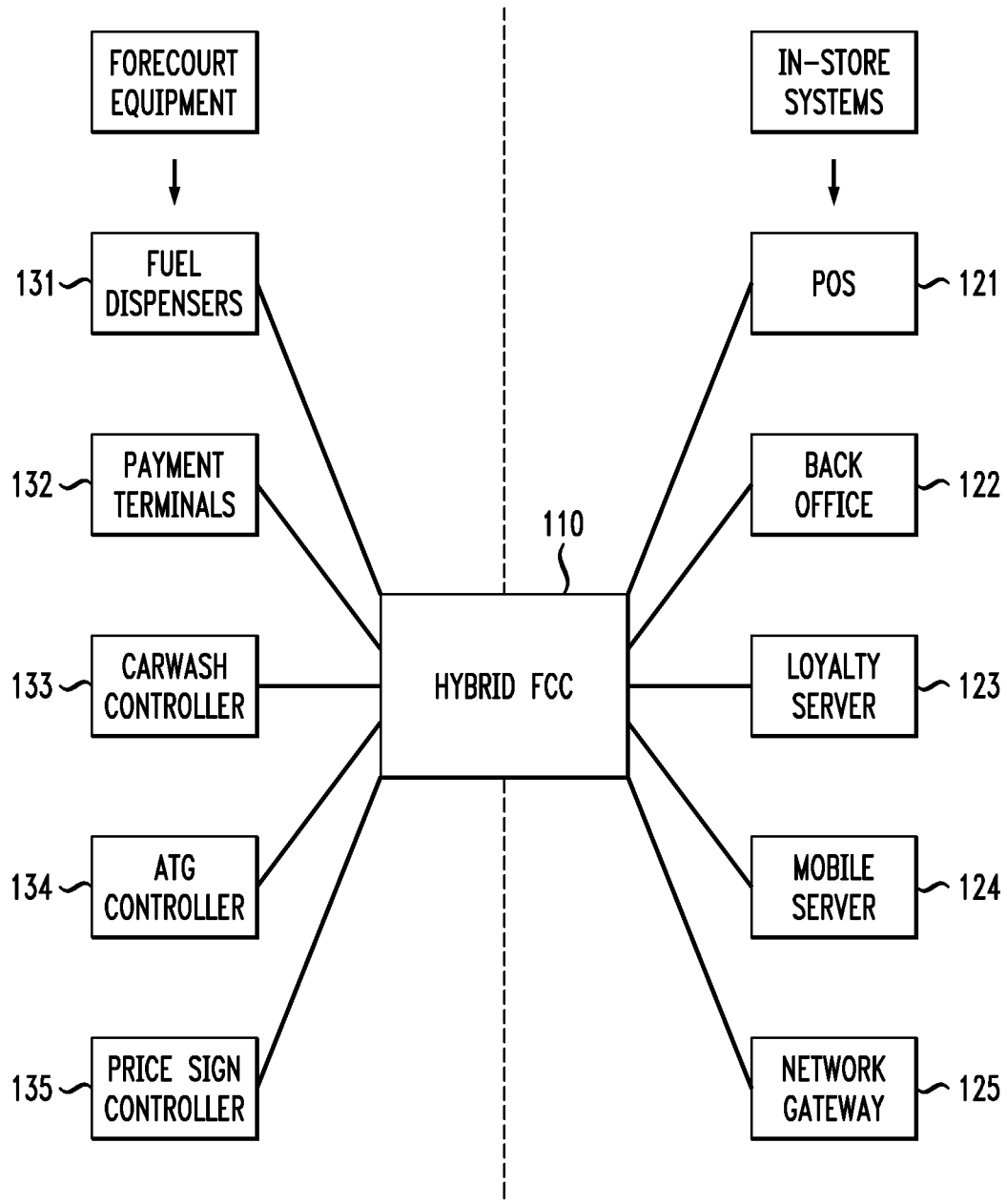
FIG. 1 is a block diagram of a hybrid FCC configured in an example fuel-dispensing facility having both in-store systems residing inside a building of the facility and forecourt equipment residing outside the building, according to one possible embodiment of the invention.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Forecourt controllers (FCCs) to date have been "closed" systems, where the manufacturer defines all aspects of the hardware and software and provides tools to configure the system, as well as a mechanism for the user to download new versions of the FCC software. According to certain embodiments of the present invention, a hybrid FCC combines a conventional FCC having a closed operating system and an open, embedded operating system into a single hardware/software platform. Software vendors and customers (e.g., merchants) define how the open, embedded portion of the hybrid FCC is utilized. An open operating system is a computer system for which information is publicly available to enable third parties to develop new software applications that can run on that computer system. A closed operating system, on the other hand, is a computer system for which that information is not publicly available. A closed operating system allows only specific software programs to run; those programs are created by vendors with specialized knowledge, tools, and licenses allowing them to create software that will run on the closed operating system. Embedded operating systems, such as Windows Embedded Standard and Embedded Linux, are versions of general-purpose operating systems that have been customized to run on embedded hardware platforms. Embedded hardware platforms are typically single-board computer systems with limited and specific capabilities. Embedded operating systems allow the system designer to define and deploy capabilities at a more granular level than is available with general-purpose implementations. This means that the system designer can limit functionality, increase security, and control resources (disk, memory) usage to control and improve system performance.

In one embodiment, the hybrid FCC comprises a legacy closed, FCC operating system, such as a NeXGen FCC by Allied Electronics, Inc., of Bristol, Pa., cohabiting with an open, embedded operating system, such as a Microsoft Windows Embedded Standard or Embedded Linux operating system, on a single piece of hardware. The NeXGen FCC is described in "Station Site Controller (NeXGen) Training Manual," Allied Electronics, Inc. (Feb. 25, 2014), the teachings of which are incorporated herein by reference.

These two operating systems may be conceptualized as two different sub-systems, referred to as the closed, FCC sub-system and the open, embedded sub-system. So a hybrid FCC is a system comprising two independent sub-systems: one closed and one open.

In certain embodiments, the invention is a hybrid forecourt controller (FCC) for a fuel-dispensing facility comprising one or more forecourt devices and one or more in-store systems. The hybrid FCC comprises (i) a closed sub-system configured to communicate with and control operations of the one or more forecourt devices and (ii) an open sub-system configured to integrate, communicate with, and control operations of the one or more in-store systems. The closed sub-system comprises closed-sub-system hardware, a closed operating system, and one or more closed software applications corresponding to the one or more forecourt devices, where the closed operating system and the one or more closed software applications are executed by the closed-sub-system hardware. The open sub-system comprises open-sub-system hardware, an open operating system, and one or more open software applications corresponding to the one or more in-store systems, wherein the open operating system and the one or more open software applications are executed by the open-sub-system hardware. The closed sub-system is configured to communicate with the open sub-system to enable the one or more forecourt devices and the one or more in-store systems to operate together to support operations of the fuel-dispensing facility. The closed sub-system is configured to prevent third parties from modifying (including updating or altering) any of the closed operating system and the one or more closed software applications of the closed sub-system. The open sub-system is configured to enable third parties to modify any of the open operating system and the one or more open software applications of the open sub-system.

FIG. 1 is a block diagram of a hybrid FCC 110 configured in an example fuel-dispensing facility 100 having both in-store systems 121-125 residing inside a building of the facility, such as a convenience store, gas station, etc., and forecourt equipment 131-135 residing outside the building, according to one possible embodiment of the invention. The in-store systems shown in FIG. 1 include:

Point-of-sale (POS) system 121, typically operated by a cashier, for sales inside the store as well as fueling transactions;

Back-office (BO) system 122, used by management for sales tracking, reconciliation, and other business purposes;

Loyalty Server system 123, which processes customer loyalty transactions, returning discounts or rewards to the customer;

Mobile Server system 124, which facilitates payments originating from the customer's mobile phone; and Network Gateway 125, a switch/router giving access to off-site systems, sited at the merchant's home office or other secure locations.

The forecourt equipment shown in FIG. 1 includes:

Fuel dispensers 131 pumping gasoline, diesel, or other fuels such as liquid natural gas (LNG)/compressed natural gas (CNG), propane, ethanol;

Dispenser payment terminals 132 accepting credit/debit cards, cash as well as non-contact forms of payment (barcodes, mobile phones, RFID tags);

Carwash controller 133 to turn a car wash system on or off, and dispense car wash "codes" that can be redeemed;

ATG Controller 134 which sends control information to and receives data from ATGs (automated tank gauges) for the reporting of underground tank inventory; and Price sign controller 135 that sends prices to electronic price signs.

Figure 2:
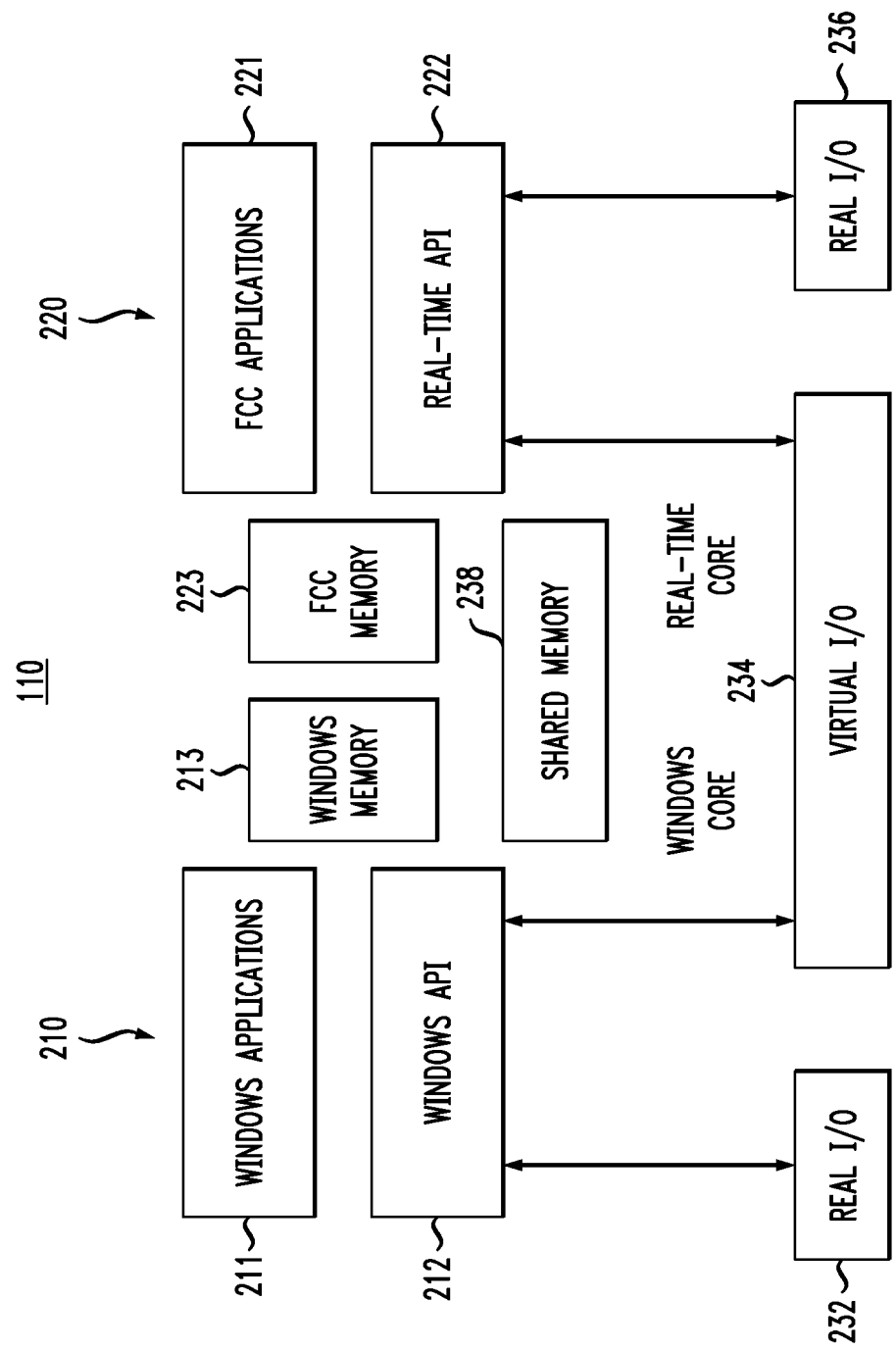
FIG. 2 is a block diagram of the software architecture for one possible implementation of the hybrid FCC of FIG. 1.

FIG. 2 is a block diagram of the software architecture for one possible implementation of the hybrid FCC 110 of FIG. 1, where the left side of the figure represents processes and resources that comprise the open, embedded sub-system 210 and the right side of the figure represents processes and resources that comprise the closed, FCC sub-system 220. In the open, embedded sub-system 210, Microsoft Windows applications 211 use the Windows API 212 for access to real I/O 232, virtual I/O 234, and Windows memory 213. In the closed, FCC sub-system 220, FCC applications 221 use a real-time API 222 for access to real I/O 236 (e.g., hard drivers, serial ports, displays), virtual I/O 234 (e.g., virtual network interfaces), and FCC memory 223. Both applications have access to shared memory 238 via their respective APIs.

Figure 3:
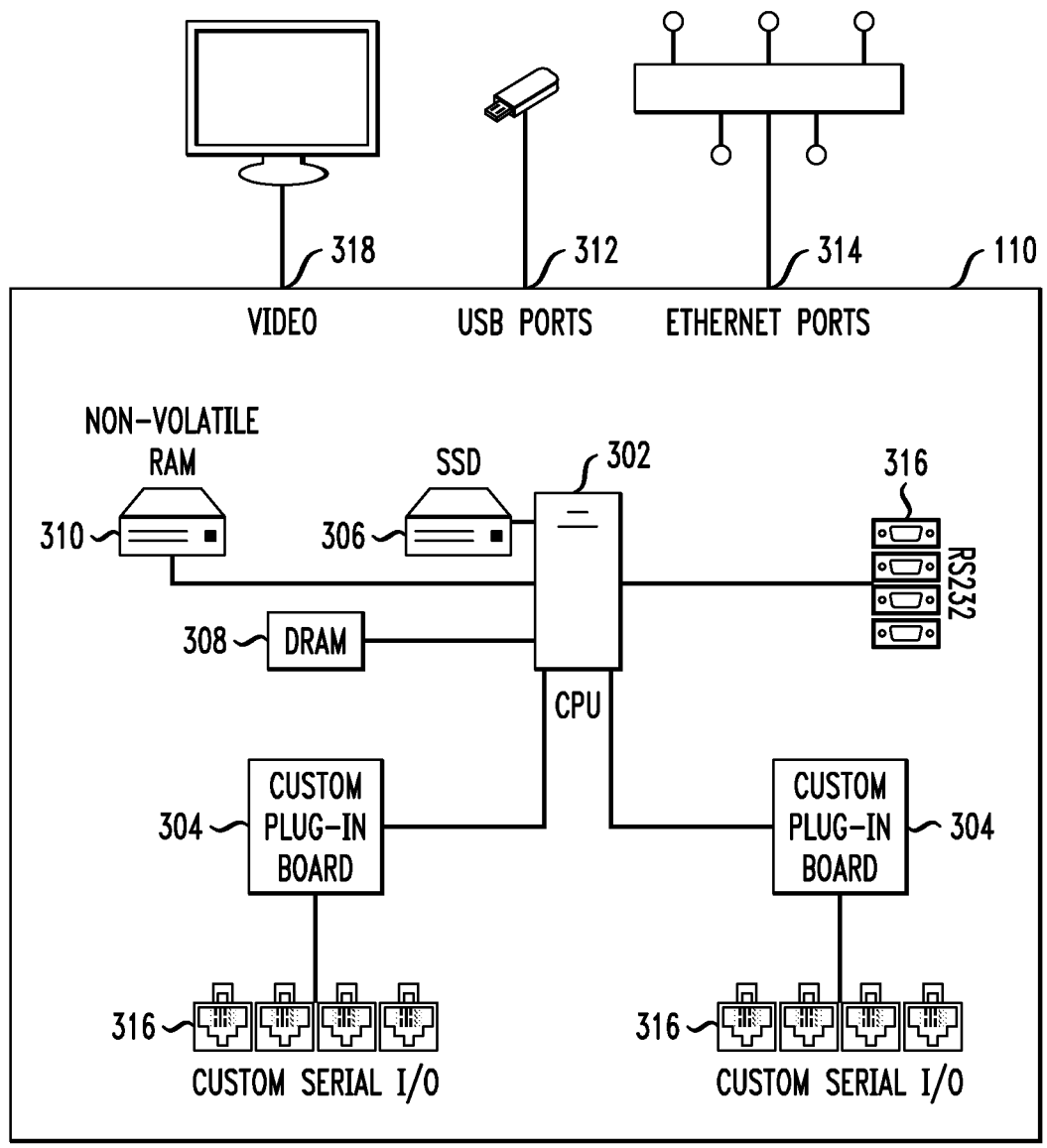
FIG. 3 is a block diagram of the hardware architecture for one possible implementation of the hybrid FCC of FIGS. 1 and 2.

FIG. 3 is a block diagram of the hardware architecture for one possible implementation of the hybrid FCC 110 of FIGS. 1 and 2. The hybrid FCC 110 comprises a main board with a conventional, multi-core CPU (central processing unit) 302 and one or more custom-designed plug-in boards 304 for forecourt serial communication. The plug-in boards 304 are used by the FCC sub-system 220 of FIG. 2 to communicate with the automated fuel dispensers 131, payment terminals 132, and other forecourt equipment of FIG. 1. The hybrid FCC 110 may also include the typical hardware elements of an embedded system, such as one or more SSDs (solid-state drives) 306, one or more DRAM (dynamic random access memory) devices 308, one or more non-volatile RAM devices 310, one or more USB (Universal Serial Bus) ports 312, one or more Ethernet ports 314, one or more RS232 and/or custom serial ports 316, and one or more video interfaces 318.

In certain implementations, one CPU core (referred to as "an FCC core") is dedicated to the closed, FCC sub-system 220 of FIG. 2, while one or more other CPU cores (each referred to as "an embedded core") are dedicated to the open, embedded sub-system 210 and the merchant/partner applications 211 of the embedded sub-system 210 running there. The configuration is flexible: the FCC and embedded sub-systems 220 and 210 have access to and can share the hardware resources. This hardware sharing is determined when the system boots, and varies based on merchant/partner needs.

In general, the closed, FCC sub-system 220 is responsible for communicating with and controlling the operations of the forecourt equipment 131-135 of FIG. 1, while the open, embedded system 210 is responsible for communicating with and controlling the operations of the in-store systems 121-125 of FIG. 1. In particular, the closed, FCC sub-system 220 provides real-time communication and control functions to the automated fuel dispensers 131, payment terminals 132, car wash controllers 133, and other forecourt devices of FIG. 1, returning data from those forecourt devices to the POS (point-of-sale) and other in-store systems of FIG. 1, and sending commands to those forecourt devices from the in-store systems of FIG. 1. The open, embedded sub-system 210 provides functions normally found in other PC-based or server-based components. These functions include EPS (electronic payment services), POS, BO (back office), and other management functions.

The hybrid FCC integrates legacy FCC functions as well as some in-store sub-systems into a single hardware enclosure. This reduces overall costs to the merchant purchasing the system. Furthermore, real-time, closed systems and embedded, open systems have less down time and greater reliability than general-purpose systems.

Because the closed FCC sub-system is able to use the same application "source code" as legacy FCCs, customer investment in legacy systems is preserved.

The two sub-systems 210 and 220 communicate using TCP/IP, shared memory, and software mailboxes.

The hybrid FCC 110 reacts quickly to events (i.e., responding in "real time") and guarantees predictable and consistent response times (i.e., demonstrates "determinism"). For this reason, the FCC sub-system 220 uses an RTOS (real-time operating system), such as the INtime for Windows operating system from TenASys Corporation in Beaverton, Oreg.

Conventional Windows-based FCCs tend to suffer performance degradation when asked to control large sites with high transaction volumes or many fueling points. In the hybrid FCC 110, the inclusion of the open, embedded sub-system 210 does not inhibit or diminish the performance of the hybrid FCC 110 compared to legacy FCCs. For example, the closed, FCC sub-system 220 does not have to give up CPU cycles to service the needs of the open, embedded sub-system 210 because each OS (e.g., Windows and INtime) runs in its own CPU core(s).

When the hybrid FCC 110 powers up, the embedded core boots first, starting the open, embedded sub-system 210. For an FCC sub-system 220 that runs on the INtime for Windows operating system, once the embedded sub-system 210 is up, the FCC core starts the closed, FCC sub-system 220.

The FCC sub-system 220 does not require any specific applications to be running on the embedded sub-system 210, although there are mechanisms allowing the software in the two sub-systems to communicate. These include, but are not limited to:

TCP/IP communications via a virtual network;
Memory-resident mailboxes and queues; and
Shared memory 238 of FIG. 2.

Because of this independence, the hybrid FCC 110 is able to run a variety of partner- or customer-supplied applications 210 on the embedded core. These include:

EPS software;
POS Database components;
Leak detection software; and
Mobile payment server components.

In the past, vendor/partners and merchants needing to create and run software at a site had to either a) deploy hardware specifically designed for that purpose or b) locate that software on an existing system (such as a POS 121 or BO 122 of FIG. 1), complicating deployment and maintenance and degrading performance. The hybrid FCC 110 seamlessly combines two unlike operating systems (e.g., INtime and Embedded Windows), allowing merchants and software vendors to have complete control of the software running on the embedded core, while gleaning all the traditional benefits of a dedicated legacy FCC. The hybrid FCC 110 therefore is a new generation of FCC, combining a conventional FCC, such as the proven, reliable, robust NeXGen FCC, with the flexibility and openness of an embedded operating system.

Although the invention has been described in the context of the hybrid FCC 110 that combines (i) a closed, FCC sub-system 220, such as the NeXGen FCC running the INtime operating system, and (ii) an open, embedded sub-system 210, running an open operating system such as the Embedded Windows operating system, the invention is not so limited. In general, hybrid FCCs of the invention combine any suitable, closed, FCC system and any suitable, open, embedded system.

Depending on the implementation, the hybrid FCC 110 of FIG. 1 can provide one or more of the following features:

Legacy FCC software (e.g., from Allied Electronics Inc.'s NeXGen FCC) can be quickly converted to run on the hybrid FCC 110 by using a software "abstraction layer."

To "port" an application from one hardware platform to another, the application code (which provides user-facing features) is preserved, but the system code (which provides access to computing resources) is rewritten or replaced. Typically, legacy FCCs have been built using a proprietary RTOS (Real-Time Operating System). These legacy systems are resistant to easy "porting" because the application programming and the system programming are enmeshed and therefore difficult to separate.

The legacy NeXGen FCC application was written using an OS abstraction layer, and the hybrid FCC 110 can support that same abstraction layer, meaning that the application code does not have to be aware of the OS on which it was running. This design allows the legacy application to run on the hybrid FCC 110 with virtually no changes to the application code.

New FCC features added to the legacy FCC software are immediately available to the hybrid FCC 110, and vice versa.

Because the application code does not need to be changed based on the hardware platform on which it runs, application code changes that add customer features may be deployed to either or both hardware platforms.

Thus, the effort to code, test, and document a single new feature yields the benefit of that same feature being available on both legacy FCCs and the hybrid FCC 110.

Custom hardware allowing communication with non-standard serial interfaces (e.g., current loop) is integrated into the same platform that runs the open, embedded software.

Systems using virtualization typically run on COTS hardware. Using COTS hardware to connect to forecourt devices requires adding external converters and cables (e.g., RS232 cables to current-loop converters) which add cost and reduce reliability.

Integrating custom communication hardware into the hybrid FCC 110 eliminates the need for external converters and allows the hybrid FCC 110 to connect directly to the forecourt equipment 131-135 of FIG. 1, providing the same reliability and ease of installation as legacy FCCs.

In one possible implementation, this custom hardware includes PC-104 form factor plug-in modules, each with four (4) serial communication channels presenting a specific interface such as current loop, RS-485, etc.

Custom hardware allows a seamless migration path for existing users of legacy FCCs.

Because the custom hardware is the same as that used on the legacy NeXGen FCC, existing customers can obtain the benefits of the hybrid FCC 110 without having to change existing wiring, junction boxes, etc.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A hybrid forecourt controller (FCC) for a fuel-dispensing facility comprising one or more forecourt devices and one or more in-store systems, the hybrid FCC comprising: a closed sub-system configured to communicate with and control operations of the one or more forecourt devices; and an open sub-system configured to integrate, communicate with, and control operations of the one or more in-store systems, wherein: the closed sub-system comprises closed-sub-system hardware, a closed operating system, and one or more closed software applications corresponding to the one or more forecourt devices, wherein the closed operating system and the one or more closed software applications are executed by the closed-sub-system hardware; the open sub-system comprises open-sub-system hardware, an open operating system, and one or more open software applications corresponding to the one or more in-store systems, wherein the open operating system and the one or more open software applications are executed by the open-sub-system hardware; the closed sub-system is configured to communicate with the open sub-system to enable the one or more forecourt devices and the one or more in-store systems to operate together to support operations of the fuel-dispensing facility; the closed sub-system is configured to prevent third parties from modifying any of the closed operating system and the one or more closed software applications of the closed sub-system; the open sub-system is configured to enable third parties to modify any of the open operating system and the one or more open software applications of the open sub-system; and wherein the open sub-system of the hybrid FCC is distinct from any point-of-sale system of the fuel-dispensing facility.

2. The hybrid FCC of claim 1, wherein:
the closed sub-system is based on a legacy FCC; and
the open sub-system is an embedded sub-system.

3. The hybrid FCC of claim 2, wherein legacy software of the legacy FCC is executed in the closed sub-system using an abstraction layer between the legacy software and the open operating system.

4. The hybrid FCC of claim 1, further comprising a multi-core processor, wherein:
the closed-sub-system hardware comprises at least one core of the multi-core processor; and
the open-sub-system hardware comprises at least one other core of the multi-core processor.

5. The hybrid FCC of claim 1, wherein:
the one or more forecourt devices comprise one or more of:
at least one fuel dispenser;

at least one payment terminal;
at least one carwash controller;
at least one automated tank gauge controller; and
at least one price sign controller; and
the one or more in-store systems comprise one or more of:
a point-of-sale system;
a back-office system;
a loyalty server system;
a mobile server system; and
a network gateway.

6. The hybrid FCC of claim 5, wherein:
the one or more forecourt devices comprise:
at least one fuel dispenser;
at least one payment terminal;
at least one automated tank gauge controller; and
at least one price sign controller; and
the one or more in-store systems comprise:
a point-of-sale system;
a back-office system;
a loyalty server system;
a mobile server system; and
a network gateway.

7. The hybrid FCC of claim 6, wherein:
the closed sub-system is based on a legacy FCC;
the open sub-system is an embedded sub-system;
legacy software of the legacy FCC is executed in the closed sub-system using an abstraction layer between the legacy software and the open operating system; and
further comprising a multi-core processor, wherein:
the closed-sub-system hardware comprises at least one core of the multi-core processor; and
the open-sub-system hardware comprises at least one other core of the multi-core processor.

8. A fuel-dispensing facility comprising: one or more forecourt devices; one or more in-store systems; and a hybrid forecourt controller (FCC) comprising (i) a closed sub-system configured to communicate with and control operations of the one or more forecourt devices and (ii) an open sub-system configured to integrate, communicate with, and control operations of the one or more in-store systems, wherein: the closed sub-system comprises closed-sub-system hardware, a closed operating system, and one or more closed software applications corresponding to the one or more forecourt devices, wherein the closed operating system and the one or more closed software applications are executed by the closed-sub-system hardware; the open sub-system comprises open-sub-system hardware, an open operating system, and one or more open software applications corresponding to the one or more in-store systems, wherein the open operating system and the one or more open software applications are executed by the open-sub-system hardware; the closed sub-system is configured to communicate with the open sub-system to enable the one or more forecourt devices and the one or more in-store systems to operate together to support operations of the fuel-dispensing facility; the closed sub-system is configured to prevent third parties from modifying any of the closed operating system and the one or more closed software applications of the closed sub-system; the open sub-system is configured to enable third parties to modify any of the open operating system and the one or more open software applications of the open sub-system; and wherein the open sub-system of the hybrid FCC is distinct from any point-of-sale system of the fuel-dispensing facility.

9. The fuel-dispensing facility of claim 8, wherein:
the closed sub-system is based on a legacy FCC; and
the open sub-system is an embedded sub-system.

10. The fuel-dispensing facility of claim 9, wherein legacy software of the legacy FCC is executed in the closed sub-system using an abstraction layer between the legacy software and the open operating system.

11. The fuel-dispensing facility of claim 8, further comprising a multi-core processor, wherein:
the closed-sub-system hardware comprises at least one core of the multi-core processor; and
the open-sub-system hardware comprises at least one other core of the multi-core processor.

12. The fuel-dispensing facility of claim 8, wherein:
the one or more forecourt devices comprise one or more of:
at least one fuel dispenser;
at least one payment terminal;
at least one carwash controller;
at least one automated tank gauge controller; and
at least one price sign controller; and
the one or more in-store systems comprise one or more of:
a point-of-sale system;
a back-office system;
a loyalty server system;
a mobile server system; and
a network gateway.

13. The fuel-dispensing facility of claim 12, wherein:
the one or more forecourt devices comprise:
at least one fuel dispenser;
at least one payment terminal;
at least one automated tank gauge controller; and
at least one price sign controller; and
the one or more in-store systems comprise:
a point-of-sale system;
a back-office system;
a loyalty server system;
a mobile server system; and
a network gateway.

14. The fuel-dispensing facility of claim 13, wherein:
the closed sub-system is based on a legacy FCC;
the open sub-system is an embedded sub-system;
legacy software of the legacy FCC is executed in the closed sub-system using an abstraction layer between the legacy software and the open operating system; and
further comprising a multi-core processor, wherein:
the closed-sub-system hardware comprises at least one core of the multi-core processor; and
the open-sub-system hardware comprises at least one other core of the multi-core processor.

\* \* \* \* \*